Patented June 15, 1943

2,321,593

UNITED STATES PATENT OFFICE 2,321,593

PREPARATION OF UNSYMMETRICAL ACETALS

William F. Gresham, Wilmington, Del., assignor to E. I. du Pont de Nemours & Company, Wilmington, Del., a corporation of Delaware No Drawing. Application August 22, 1940, Serial No. 353,658

3 Claims. (Cl. 260—615)

This invention relates to the preparation of unsymmetrical acetals and their derivatives and more particularly to the preparation of alkoxy methoxy alcohols by the interaction of polyhydric alcohol acetals with alcohols.

An object of the invention is to provide a process for the preparation of the higher unsymmetrical acetals. A further object is to provide a process for the preparation of high molecular weight acetals by the interaction of linear and cyclic polyhydric alcohol acetals with aliphatic alcohols in the presence of suitable catalysts. Yet another object of the invention is to provide a process for the preparation of alkoxy alkoxy alcohols by reacting glycol acetals with aliphatic monohydric alcohols. Other objects and advantages of the invention will hereinafter appear.

Broadly, the process may be conducted by reacting a polyhydric alcohol acetal or a (polyhydric alcohol ether) acetal with an alcohol in the presence of an acidic catalyst, the reaction preferably being conducted under reflux at atmospheric pressure. Elevated or reduced pressures may be employed if desired with temperatures corresponding to the pressures used. Temperatures ranging between 0 and 200° C. are generally effective for these reactions. The reaction may be conducted for from 1 to 5 hours, after which the catalyst is neutralized and the products recovered by fractional distillation or by other suitable recovery processes.

It has been indicated that the reaction proceeds preferably in the presence of an acidic type catalyst and catalysts such, for example, as sulfuric acid, paratoluene sulfonic acid, camphor sulfonic acid, hydrochloric acid, acetic acid, calcium chloride, and other organic or inorganic acid catalysts of this general reaction may be used. Such catalysts should preferably be present in amounts ranging between 0.001 and 0.1 part thereof per part of the polyhydric alcohol acetal reacted. The reaction involves stoichiometrically equimolecular proportions of the polyhydric alcohol acetal or other acetal used and the alcohol. It has been found, however, that it is usually preferably to have the alcohol present in excess, say between 2 to 5 moles thereof per mole of the acetal.

The reaction may be illustrated by the formula designating the reaction of di-(β-hydroxyethyl) formal with methanol,

wherein there is obtained as a result of the reaction (methoxy-methoxy) ethanol and ethylene glycol. By substituting other aliphatic monohydric alcohols for the methanol, other alkyl substituted unsymmetrical formals will be obtained such as the ethoxy, n- and iso-propoxy, n- and iso-butoxy, and higher (alkoxy methoxy) alcohols when ethanol, n- and iso-propanol, n- and iso-butanol, and the higher aliphatic alcohols, respectively, are reacted with di-(β-hydroxyethyl) formal. The higher straight and branched chain monohydric alcohols, both aromatic and aliphatic, may be likewise employed. Polyhydric alcohols such, for example, as ethylene glycol, diethylene glycol, glycerol and the like are also suitable. Formals other than di-(β-hydroxy-ethyl) formal may be used, such, for example, as glycerol formal, glycol polyformal, glycerol polyformal, erythritol polyformal, arabitol polyformal, and mannitol polyformal. Acetals higher than the formals may likewise be used as examples of these may be designated, glycol acetal, glycerol acetal, diethylene glycol acetal, and the like.

The process of the present invention is likewise applicable to the preparation of ether-substituted derivatives of the compounds disclosed in the above paragraph prepared from the mono and di ethers of the polyhydric alcohol acetals. The simplest compound in this class may be illustrated by the reaction of di-(β methoxyethyl) formal with methanol in accord with the process illustrated by the following equation:

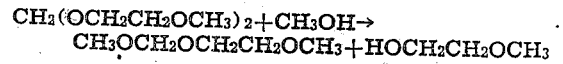

By this process the methyl ether of (methoxymethoxy) ethanol is obtained. Similarly, ethers of the alcohols prepared by the processes designated above may be obtained by reacting a polyhydric alcohol ether acetal with an alcohol.

After the reaction has been carried to substantial completion as has been designated, the acidic catalyst, if used, is neutralized and the product is preferably removed by fractional distillation after destroying the catalyst. In some instances the reaction may proceed in the absence of a catalyst in which instance the unsymmetrical acetal may, if desired, be removed as formed by extraction or by other suitable means.

The examples which follow illustrate the invention by specific embodiments which do not limit its scope. Parts given are by weight.

*Example 1.*—Preparation of (methoxymethoxy) ethanol, CH₃OCH₂OCH₂CH₂OH, from di-(β-hydroxyethyl) formal, CH₂(OCH₂CH₂OH)₂.

A mixture containing 119 parts of di-(β-hydroxyethyl) formal, CH₂(OCH₂CH₂OH)₂, 56 parts of methanol, and 2 parts of concentrated sulfuric acid was boiled under a reflux at atmospheric pressue for approximately two hours. The sulfuric acid catalyst was neutralized by adding sodium methoxide and the resulting neutralized crude product fractionally distilled whereupon (methoxymethoxy) ethanol was obtained in a yield of 38%; it has a boiling point between 78 and 80° C. at 31 mm.

*Example 2.*—(Methoxymethoxy) ethanol from glycol polyformal.

A mixture containing 148 parts of glycol polyformal, 90 parts of methanol and 2 parts of concentrated sulfuric acid was refluxed at atmospheric pressure for approximately two hours. After neutralizing the acid with sodium methoxide the crude product was distilled, methylal and methanol stripped off and by fractional distillation 48 parts of (methoxymethoxy) ethanol was obtained, together with 113 parts of higher boiling materials.

It will be appreciated that the process hereinbefore described provides a number of new unsymmetrical formals and ethers thereof and particularly describes a process for the preparation of the simpler unsymmetrical formals such as the alkoxy methoxy ethanols. It has been found that (methoxymethoxy) ethanol is peculiarly fitted for a large number of uses as are likewise a number of the other products prepared in accord with this invention. There are listed here a number of specific uses for which (methoxymethoxy) ethanol is especially well adapted and in many of these uses a number of the other products obtained in accord with the process of this invention are likewise suitable.

*Insecticidal uses.*—Its low volatility and complete miscibility with water and most organic materials make beta-(methoxymethoxy) ethanol an excellent insecticide ingredient. It is a good carrier for contact poisons such as nicotine derivatives, polycarboxylic organic acid esters, long chain acid amides and organic sulphur compounds which are used in controlling aphids, codling moth, flies and various scab diseases. When used in this connection, the solvent acts as a wetting and penetrating agent assisting in distributing the active ingredient over the areas sprayed or treated. Esters of beta-(methoxymethoxy) ethanol, such as the acetate, maleate and aconitate, are contact poisons for aphids, flies and other insects. These esters can be applied in beta-(methoxymethoxy) ethanol or other organic solvent solutions by spraying methods.

*Absorbent for refrigerants.*—Ammonia and dichlordifluorethane refrigerants are soluble in beta-(methoxymethoxy) ethanol at room temperature. This solvent can therefore be used as a carrier for soluble refrigerants in absorption refrigeration systems. Its low volatility, non-inflammability and inertness towards metals are marked advantages in this use.

*Flotation agents.*—The xanthate and sulphide of beta-(methoxymethoxy) ethanol are suitable collectors for the flotation of ores, such as calcium, zinc, lead and sulphide ores. They cause the desired mineral to float and sink the undesirable products, thus causing a separation. Relatively small quantities are consumed in bringing about this separation.

The di- and tribeta-(methoxymethoxy) ethyl amines are good frothing agents, causing a separation usually referred to as reverse flotation. For example, the undesirable material floats and the desirable product sinks. This type of flotation is used to purify calcium or magnesium carbonates, iron oxide or ilmenite ores from the undesirable products occurring with them.

*Refining and extraction of vegetable and animal oils, fats and waxes.*—Beta-(methoxymethoxy) ethanol readily dissolves oils, fats and waxes, such as castor oil, corn oil, soybean oil, cotton-seed oil, lanolin, copal and ester gum, particularly at elevated temperatures. It can be used in extraction processes involving the separation of these materials from seeds, animal refuse and various fibrous materials and also in the refining of the separated oils by selective solvent extraction processes. Most of the oils, fats and waxes have a relatively high increase in solubility in beta-(methoxymethoxy) ethanol with increasing temperature. This makes it possible to separate a considerable portion of the desired material from the hot solvent by cooling the solution until two phases appear. The solvent-rich fraction can be reused without further treatment. The remaining solvent can be removed from the oil fraction by vacuum distillation. Also, all of the solvent can be vacuum distilled from the oil and reused.

*Degreasing solvent for glues, gelatin, casein, leather, paper, etc.*—The excellent solvent action of beta-(methoxymethoxy) ethanol for fats, particularly at 100–125° C., makes it a suitable agent for degreasing glue, gelatin, casein, leather, paper and similar products. In the case of glue, gelatin and casein, this can be done by agitating the solvent and the material to be degreased at 100–125° C. and filtering. The last trace of solvent can be removed by vacuum distillation or a similar means.

Leather and paper are immersed in the hot solvent for several minutes and the solvent removed by drying in hot air or similar evaporation method.

*Anti-freeze.*—Beta-(methoxymethoxy) ethanol is a suitable anti-freeze for use in refrigeration, air conditioning, and cooling systems. It is high boiling, low freezing and has much higher flash point than methanol and ethanol anti-freezes. It has a lower freezing point, lower viscosity, and is less corrosive than ethylene glycol, which is used extensively as a so-called permanent anti-freeze. Approximate freezing points of water solutions are given below:

| Percent water: | Freezing point, °F. |
|---|---|
| 0 | −55 |
| 25 | −40 |
| 50 | −90 |
| 75 | +18 |

*Paint and varnish removers.*—Beta-(methoxymethoxy) ethanol is an ideal component for use in paint and varnish removers. Suitable formulas for such removers are—

Formula 1:

| | Parts by weight |
|---|---|
| Paraffin wax | 3 |
| Beta-(methoxymethoxy) ethanol | 55 |
| Benzol | 20 |
| Carbon tetrachloride | 15 |
| Xylol | 10 |

Formula 2:

| | |
|---|---|
| Paraffin wax | 3 |
| Benzol | 8 |
| Beta-(methoxymethoxy) ethanol | 7 |

These are effective removers functioning with a minimum of effort and material consumed.

*Solvent for pigment drying.*—After pigments and dry colors are wet ground, they often agglomerate badly during drying. A dry pigment with more satisfactory dispersion characteristics can be obtained by treating the wet pigment with a solvent, such as beta-(methoxymethoxy) ethanol in which the pigment is insoluble, but which is completely miscible with and has a boiling point above water. This permits the preparation of anhydrous pigment-solvent mixture from which a pigment having good dispersion characteristics can be obtained by drying. Some of the pigments which can be treated by this method are titanium oxide, various sulphide pigments, iron blue, copper phthalocyanine and chlorinated copper phthalocyanine.

*Window cleaning fluid.*—Beta-(methoxymethoxy) ethanol is an excellent ingredient for use in window cleaning fluids. 5–20% solution in water will enable dirt and grease to be removed easily and quickly with a cloth which will then dry the window at the same time.

*Finger nail polish and remover.*—Beta-(methoxymethoxy) ethanol solutions containing up to 25% water are suitable nail polish removers. Advantages are that they are practically odorless, and have low solubility for natural oils of the skin.

Beta-(methoxymethoxy) ethanol can be used as a high boiling solvent in the nail polish itself. Such solvents tend to reduce blushing and give good flowing characteristics insuring uniform, free flowing film. A typical composition utilizing beta-(methoxymethoxy) ethanol is:

| | Ounces |
|---|---|
| One-half sec. R. S. wet cotton | 24 |
| Ethyl acetate | 25 |
| Toluene | 48 |
| Butyl acetate | 20 |
| Beta-(methoxymethoxy) ethanol) | 14 |
| Damar solution | 19 |
| Dibutyl phthalate | 2 |
| Tricresyl phosphate | 2 |

*Softening agent in cork processing.*—A softening agent is desirable in the processing of cork to reduce brittleness, permitting objects of desired shapes to be cut from large pieces without undue waste. Beta-(methoxymethoxy) ethanol is a suitable softening agent for this purpose. The cork is treated by immersing it for several minutes in the solvent, after which it is worked into the desired shapes and dried.

*Carbon remover.*—Carbon deposition in high compressing engines, particularly automobile engines, causes knocking and loss of power due to increase of the compression ratio. It has been found that beta-(methoxymethoxy) ethanol will loosen carbon deposits, causing them to be removed in the exhaust gases thus eliminating the necessity of dismantling the engine and scraping the carbon out by hand. An effective method for applying the solvent is to suck about one pint to one quart into the air intake manifold of the carburetor at such a rate that the motor will be choked completely as the last of the solvent is added. The motor is allowed to stand for thirty minutes to one hour to permit the solvent to loosen up the more tightly bound carbon, which is expelled when the motor is started again. This procedure can be repeated at the intervals required to prevent knocking.

The above discussion has described the use of (methoxymethoxy) ethanol and its derivatives; the other alcohols and ethers prepared in accord with this invention and having suitable physical and chemical properties are in many instances likewise suitable for these and other uses.

I claim:

1. A process for the preparation of (methoxymethoxy) ethanol which comprises reacting under reflux ethylene glycol formal with methanol in the presence of sulfuric acid as the catalyst, after the reaction is substantially complete neutralizing the catalyst by the addition of sodium methoxide and subsequently recovering the (methoxymethoxy) ethanol by fractional distillation.

2. A process for the preparation of (methoxymethoxy) ethanol which comprises reacting glycol polyformal with methanol in the presence of sulfuric acid as the catalyst, after the reaction has been conducted for approximately two hours, neutralizing the catalyst with sodium methoxide and recovering from the crude neutralized product the (methoxymethoxy) ethanol by fractional distillation.

3. A process for the preparation of (methoxymethoxy) ethanol which comprises reacting under reflux ethylene glycol formal with methanol in the presence of an acidic catalyst, after the reaction is substantially complete, neutralizing the catalyst by the addition of sodium methoxide and subsequently recovering the (methoxymethoxy) ethanol by fractional distillation.

WILLIAM F. GRESHAM.